(12) United States Patent
Knapp

(10) Patent No.: US 7,726,344 B2
(45) Date of Patent: Jun. 1, 2010

(54) DEVICE FOR DYNAMIC CONTROL OF A WATER FLOW

(75) Inventor: Alfons Knapp, Biberach an der RiB (DE)

(73) Assignees: Masco, Indianapolis, IN (US); Masco Corporation of Indiana

( * ) Notice: Subject to any disclaimer, the term of this patent is extended or adjusted under 35 U.S.C. 154(b) by 472 days.

(21) Appl. No.: 11/800,755

(22) Filed: May 7, 2007

(65) Prior Publication Data

US 2007/0289643 A1 Dec. 20, 2007

Related U.S. Application Data

(63) Continuation of application No. PCT/IB2005/003360, filed on Nov. 9, 2005.

(30) Foreign Application Priority Data

Nov. 9, 2004 (IT) .......................... TO2004A0776

(51) Int. Cl.
*F16L 55/04* (2006.01)
(52) U.S. Cl. .............................. 138/31; 138/30; 138/26; 137/513.3; 137/601.2
(58) Field of Classification Search ................... 138/45, 138/46; 137/513.3, 505.25, 601.2, 469
See application file for complete search history.

(56) References Cited

U.S. PATENT DOCUMENTS

| 3,809,111 | A | | 5/1974 | Olsson |
|---|---|---|---|---|
| 3,814,134 | A | * | 6/1974 | Vanti ........................ 137/627.5 |
| 4,044,791 | A | * | 8/1977 | McKenzie ............... 137/493.9 |
| 4,428,396 | A | * | 1/1984 | Wall ........................ 137/493.9 |
| 5,099,875 | A | | 3/1992 | Smietana |
| 6,129,112 | A | | 10/2000 | Huthmann et al. |
| 7,370,667 | B2 | * | 5/2008 | Sesser et al. ........... 137/505.25 |
| 7,575,021 | B2 | * | 8/2009 | Carnall .................. 137/505.25 |
| 2004/0007269 | A1 | | 1/2004 | Larsen |

FOREIGN PATENT DOCUMENTS

DE 4030159 3/1992
GB 721 031 A 12/1954

* cited by examiner

*Primary Examiner*—Patrick F Brinson
(74) *Attorney, Agent, or Firm*—Brinks Hofer Gilson & Lione

(57) ABSTRACT

The disclosure relates to a device for dynamic adjustment of a water flow, used to stabilize the operational mode of a thermostatic mixing tap. The inventive device includes a valve consisting of a piston and a return spring forcing the piston into a first position, said piston being displaced into two positions according to the flow. When the flow is lower than a threshold value, the piston is located in the first position and a flow limited means limits the flow. When the flow exceeds the threshold value, the piston is displaced into the second position and the flow limiting means is obviated.

8 Claims, 5 Drawing Sheets

DEVICE FOR DYNAMIC CONTROL OF A WATER FLOW

CROSS-REFERENCE TO RELATED APPLICATIONS

This application is a continuation of International Application No. PCT/IB2005/003360 filed on Nov. 9, 2005, which claims the benefit of Italian Patent Application No. TO 2004 A 000776 filed Nov. 9, 2004. The disclosures of the above applications are incorporated herein by reference.

FIELD

The present disclosure relates to a device for dynamic control of a water flow as it is employed to stabilize the function of a thermostatic mixer.

BACKGROUND

The statements in this section merely provide background information related to the present disclosure and may not constitute prior art.

Thermostatic mixers, which are suited to handling a large flow do not function properly if the flow that is demanded from them is much smaller than the maximum flow for which they are designed, which occurs, for example, when a thermostatic mixer intended for supplying a system with multiple shower units is used to supply a single shower unit. Under these circumstances, thermostatic mixers lose their stability and begin to oscillate so that the water flow piped from them is subjected to constant changes in the ratio of cold to warm water and thus sustains temperature fluctuations, which are unpleasant for the user and can even be harmful. This disadvantage can be eliminated by having the flow of cold water supplying the thermostatic mixer opposed by a resistance when small flows of mixed water are demanded, while suppressing or reducing this resistance when large flows of mixed water are demanded. This process is triggered automatically by devices for dynamic control of flow, in which it is provided that the passage cross section made available for the incoming cold water is to be reduced when the admitted flow is reduced and a larger passage cross section is to be restored when a greater flow is demanded. However, the prior art devices for dynamic control of flow generally have the disadvantage of featuring pistons that are acted upon in one direction by the pressure of the incoming water and in the other direction by a return spring. The load of the spring must therefore be adjusted according to the inlet pressure of the cold water. This means that on one hand, the device must be adapted during installation to the pressure conditions present in the system for the sake of correct functioning, while on the other hand, the device no longer functions properly when considerable variations in the inlet pressure of the cold water appear.

SUMMARY

The main task of the present invention is to produce a device for the dynamic control of a flow, the functioning of which in a broad range of applications must be independent of inlet pressure, so that during installation the device must not require any adjustments and must then not function improperly when considerable variations in inlet pressure appear.

An additional task of the present invention is to produce a device of this type for the dynamic regulation of flow that is of simple construction and is economical, while ensuring a high degree of reliability and a long life.

An additional task of the present invention is to produce a device of this type that can be fitted into a stopcock, with which thermostatic mixers are often equipped, so that no additional element must be incorporated into the system.

According to the invention, these problems are solved with a device for the dynamic control of a flow comprising, in a body, an inlet fitting, an inlet chamber, an outlet chamber, a piston, which is arranged between the inlet chamber and the outlet chamber and can be moved between a first position, which is displaced to the inlet chamber, wherein the piston constricts the flow between the inlet chamber and the outlet chamber when in the first position, and a second position, which is displaced to the outlet chamber, wherein the piston does not constrict the flow between the inlet chamber and the outlet chamber when in the second position, and a return spring, which acts upon the piston to move it to the first position, characterized by the fact that the inlet chamber is at least partly ring-shaped and encloses the piston, that the piston comprises a cylindrical shell section arranged in the area of the inlet chamber and a transverse segment, which defines an intermediate chamber and is crossed by an axially limited passage, that a flow-limiting means is arranged between the inlet fitting and the intermediate chamber, and that the axially limited passage and the return spring are proportional to one another so that the effect of the spring is essentially equal to the force that acts to shift the piston out of the first position and into the second position, when the maximum flow allowed by the flow-limiting means is discharged.

In this way, the piston cannot be displaced by the inlet pressure, since this force is exerted radially and this process, whatever its value may be, does not tend to displace the piston out of its first position and into the direction of its second position. The pressure which builds in the intermediate chamber is determined through the drop in pressure sustained by the flow when passing from the inlet fitting to the intermediate chamber via the flow-limiting means. The effect exerted on the piston axially and in the opposite direction such as that of the return spring is based essentially on the difference between the pressure prevailing in the intermediate chamber and the pressure prevailing in the outlet chamber, which, due to the drop in pressure sustained by the flow when passing through the axially limited passage present in the transverse section of the piston is smaller than the former pressure. This pressure differential acts upon the transverse section of the piston and works to overcome the force of the return spring. Suitable dimensions for the cross section of the limited passage present in the transverse section of the piston, the strength of the return spring and the characteristics of the flow-limiting means in turn make it possible for the piston not to shift out of its first position and into its second position, as long as a flow is discharged that is smaller than the maximum flow that can trigger instability in a thermostatic mixer.

If, however, a flow is demanded from the outlet chamber that is greater than that defined above, the drop in pressure occurs in the outlet chamber so that the pressure differential acting on the piston exceeds the force of the return spring, and the piston then is displaced into its second position, whereby it allows the flow to pass from the inlet chamber to the intermediate chamber and then to the outlet chamber.

Because the displacement of the piston is regulated or controlled not by the absolute pressure prevailing in the chambers of the device, but rather by the pressure differential between the intermediate chamber and the outlet chamber, which depends on the flow and the resistances resisting it, but not on the absolute pressure, the function of the device is to a large extent independent of the inlet pressure, and the device in turn requires absolutely no adjustments during installation and exhibits no irregularities in function, even when the inlet pressure varies considerably.

The flow-limiting means used in the inventive device is a widely available, low-cost valve of the prior art and is described for example in various forms in patent documents DE 40 41 116, DE 102 20 287, DE 102 28 490 and WO 01/04714. This valve provides the flow with a passage with reduced resistance as long as the flow volume of the flow does not exceed a limit preset through the construction of the flow-limiting means, while the valve, if the flow shows a tendency to exceed this limit, places a resistance against the flow, thereby limiting the flow to the maximum allowable value. Valves of this type are often fitted in devices, such as showers for example, in which the consumption must be limited—for legal reasons in certain cases. Because these valves are available for many different threshold values for flow, an adequate selection of the flow-limiting means and an appropriate proportioning of the parts of the device in the way described above are thus sufficient for creating an inventive flow-regulating device that can be adapted to the necessities of various specific applications.

The intermediate chamber in the body of the device is advantageously limited through the inlet fitting, in which an intake chamber is defined and which features a transverse wall, in which axial circumferential passages are formed, which open into the ring-shaped inlet chamber, which encloses the piston, while the flow-limiting means is installed in the center of the transverse wall.

The intake chamber and the axial circumferential passages can be formed from passages that are contained in a supplementary element, which is disposed between the body of the device and the inlet fitting, of which it is a part. This supplementary element can be advantageously manufactured from a synthetic material.

In its first closing position, the piston can abut an even surface of the inlet fitting, or it can partly engage a seat formed by the surface.

Given the extreme simplicity of the inventive device and its reduced dimensions, it is possible to fit it into a stopcock. Because thermostatic mixers are often provided with a stopcock for the purpose of simplifying maintenance, it is thus possible to install in series to the thermostatic mixer a single supplementary part that contains both the stopcock and the device for the dynamic regulation of flow instead of having to fit two different supplementary parts.

It is advantageous, particularly during the process of fitting, if the direction of piston displacement and the axis of a closing element of the stopcock coincide.

Furthermore, a stopcock containing the inventive device is also a part of the invention.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
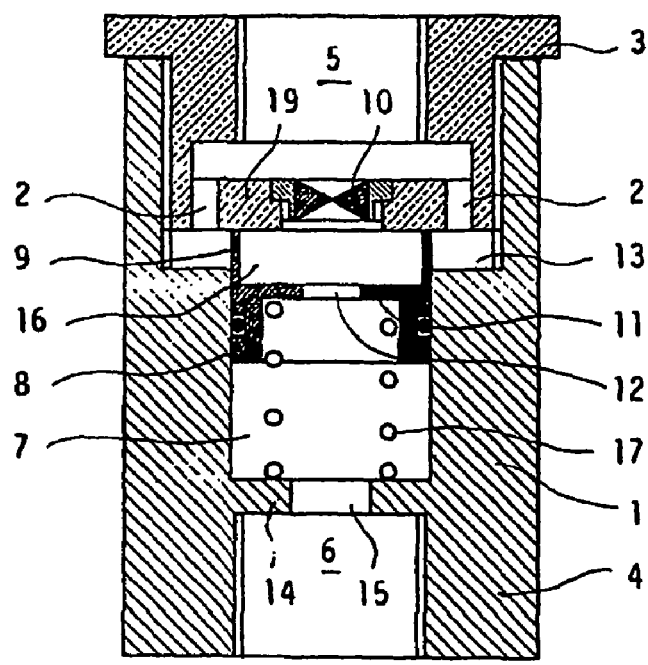
FIG. 1 represents an axial section of a device for dynamic control of a flow in accordance with a first embodiment of the present invention in a resting state or operating with reduced flow.
Figure 2:
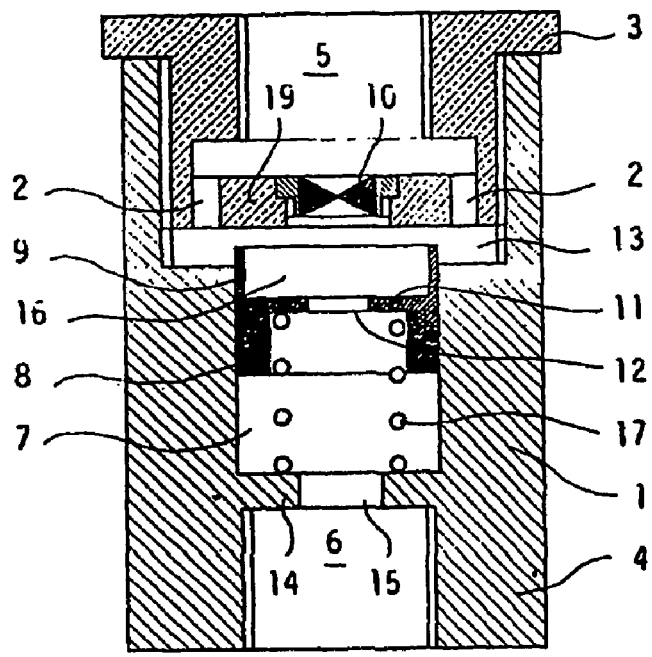
FIG. 2 represents the same device shown in FIG. 1 in a state of operating with increased flow.
Figure 3:
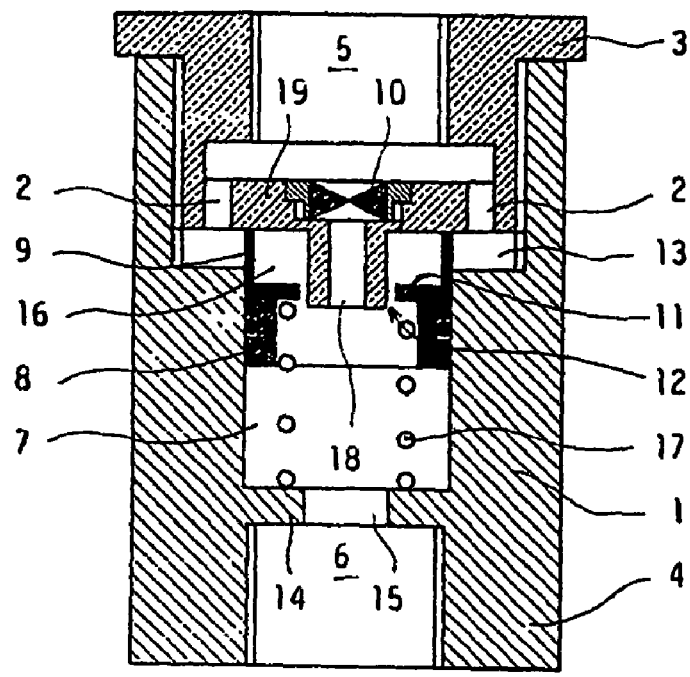
FIGS. 3 and 4 represent a second embodiment of the inventive device analogous to FIGS. 1 and 2.
Figure 4:
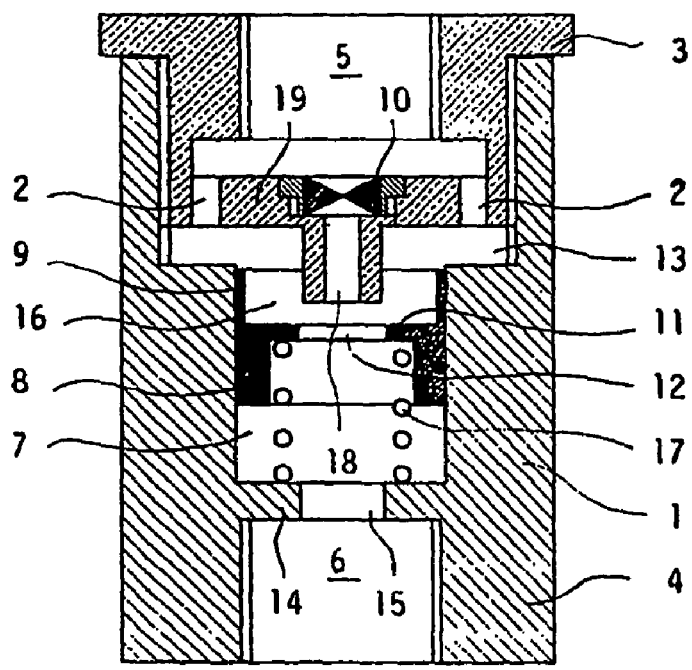

FIGS. 1 and 2 represent an axial section of a device for the dynamic control of a water flow of the type employed for the purpose of stabilizing the function of a thermostatic mixer, which comprises a body 1, which in this case is completed on top by an inlet fitting 3 and forms an outlet fitting 4. The inlet fitting 3 forms an intake chamber 5 in its interior, while the outlet fitting 4 forms an outflow passage 6 in its interior that is connected to an outlet chamber 7 that occupies the interior of the body 1.

Displaceably arranged in the outlet chamber 7 is a piston 8, which features a cylindrical shell section 9 and a transverse section 11 crossed by an axially limited passage 12. The shell section 9 and the transverse section 11 of the piston 8 define an intermediate chamber 16.

Formed in the body 1 and encircling the shell section 9 of the piston 8 is a ring-shaped inlet chamber 13, which is defined by a transverse wall 19 of the inlet fitting 3 and is supplied by the intake chamber 5 via axial circumferential passages 2, which is provided in the transverse wall 19 of the inlet fitting 3.

In the body 1, the outlet fitting 4 is defined by a transverse wall 14 crossed by a passage 15. Arranged between this wall 14 and the piston 8 is a spring 17, which in turn presses the piston 8 with the edge of its shell section 9 against the transverse wall 19 of the inlet fitting 3, which defines the inlet chamber 13. This is the resting position of the device illustrated in FIG. 1.

Installed in the central area of the transverse wall 19 of the inlet fitting 3 is a flow-limiting means 10, which in turn is located between the intake chamber 5 and the intermediate chamber 16. This permanently prevents the passage of a flow, which however cannot exceed a threshold value that is determined through the characteristics of the flow-limiting means, from the intake chamber 5 to the intermediate chamber 16 and then from there to the outlet chamber 7 and to the outflow passage 6. Because a thermostatic mixer serves to stabilize, a flow-limiting means 10 is selected so that the flow limit it defines corresponds to the maximum value of the flow that is able to cause the oscillation of the thermostatic mixer concerned.

In the resting position illustrated in FIG. 1, the entire device can be penetrated by a flow, which is limited by the flow-limiting means 10. If a flow limited in this way is present, the inlet pressure is present in the intake chamber 5 and in the inlet chamber 13, the pressure in the intermediate chamber 16 is negligibly smaller than the inlet pressure due to the drop in pressure sustained by the flow as a result of crossing through the flow-limiting means 10, and the pressure in the outlet chamber 7 is further reduced due to the drop in pressure sustained by the flow as a result of crossing through the limited passage 12. Through the difference between the pressure prevailing in the intermediate chamber 16 and the smaller pressure prevailing in the outlet chamber 7, the piston is acted upon to the effect that it moves away from the inlet fitting 3, while the spring 17 works against this process.

In contrast to this, the piston is practically not influenced by the inlet pressure present in the inlet chamber, since this pressure acts radially. On the other hand, the drops in pressure sustained by the flow depend only on the intensity of the flow and the resistances placed against it and not on the absolute value of the pressure. The behavior of the piston in turn is not influenced by the inlet pressure value and changes therein.

The limited axial passage 12 and the return spring 17 must be proportioned relative to one another so that the effect of the spring 17 is essentially equal to the force acting to displace the piston out of the first position and into the second position, when the maximum flow allowed by the flow-limiting means 10 is discharged. The piston in turn holds its first position illustrated in FIG. 1 as long as the demanded flow remains below the nominal maximum value.

If, however, a flow is demanded from the outlet fitting 4 that is greater than the maximum defined above, the pressure in the outlet chamber 7 drops, and the differential pressure acting on the piston 8 exceeds the force of the return spring 17. The piston 8 is then displaced into its second, opening position illustrated in FIG. 2. The shell section 9 ceases to interrupt the passage between the inlet chamber 13 and the intermediate chamber 16, and the passage of the flow from the inlet chamber 13 to the outlet chamber 7 is essentially allowed.

If the demanded flow is later reduced once again or completely shut off, the effect of the return spring 17 again exceeds the pressure differential acting on the piston 8, which moves back into its first closing position illustrated in FIG. 1.

In FIG. 3 through 8, which show other embodiments of the invention, the parts that are identical to or correspond to the parts of the first embodiment are labeled with the same reference numbers.

In the embodiment described until now, the flow still sustains a veritable constriction owing to the reduced passage 12 of the transverse wall 11 of the piston 8, when the piston 8 moves into its second position as a result of the passage from the inlet chamber 13 to the intermediate chamber 16 being allowed. This constriction can be eliminated in the embodiment illustrated in FIGS. 3 and 4.

In this embodiment all parts are identical to those of the embodiment illustrated in FIGS. 1 and 2 except for the fact that the passage 12 of the transverse wall 11 of the piston 8 features a significantly larger diameter so that it does not cause a damaging constriction and its cross section, when the piston 8 is in its first closed position, is reduced with the aid of a tube-shaped projection 18, which originates from the transverse wall 19 of the inlet fitting 3 and extends into the passage 12 and in which the flow coming from the flow-limiting means 10 proceeds. As FIG. 4 makes clear, when the piston 8 is displaced into its second position, the projection 18 ceases to reduce the cross section of the passage 12, which in turn no longer represents a constriction.

Figure 5:
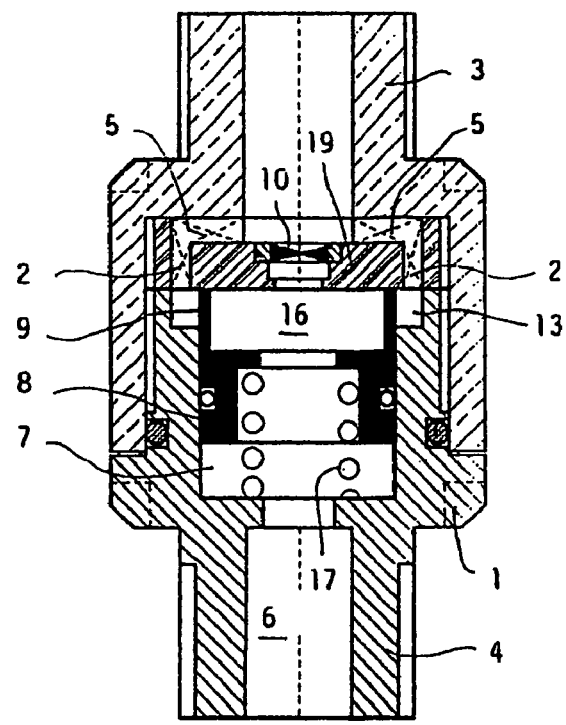
FIGS. 5 and 6 represent a third and fourth, respectively, embodiment of the invention in a resting state.

FIG. 5 illustrates an embodiment that distinguishes itself from the previous embodiments in terms of construction by featuring male instead of female connection parts. This embodiment also distinguishes itself from the previous in the construction of the inlet fitting 3, which in this example features a supplementary element 19 that is disposed between the fitting 3 and the body 1 of the device and becomes the part of the inlet fitting 3. By means of radial passages, the supplementary element 19 defines the intake chamber 5 and forms the axial circumferential passages 2, which open into the inlet chamber 13. The use of the supplementary element 19 allows the construction of the inlet fitting 3 to be simplified and is especially economical if the supplementary element 19 is made of a synthetic material.

Figure 6:
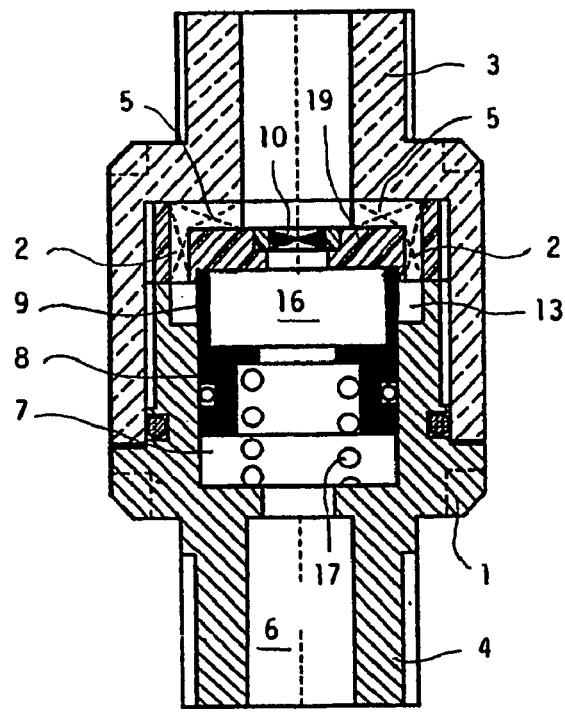

FIG. 6 shows a further configuration of the embodiment illustrated in FIG. 5. In this embodiment, the edge of the end of the shell section 9 of the piston 8, which in the previous embodiments abuts the level surface of the inlet fitting 3, partly engages in a seat recessed in this level surface. The advantage of this arrangement is found in the fact that if an abrupt variation of the outlet flow occurs, the piston 8 can coincidentally sustain a limited displacement that can bring it to the second opening position, even when the outlet flow has not exceeded the predetermined value for the suppression of the constriction of the passage cross section of the cold inlet water. In this case, if the piston 8 is closed by simply abutting the edge of the shell section 9, the passage cross-section automatically opens at least temporarily. If by contrast the arrangement described using FIG. 6 is used, a limited coincidental displacement of the piston 8 is modified so that the edge of the shell section 9 is not brought outside the seat provided in the inlet fitting, the state of constricting the passage cross-section does not appear [MD1] and provides no reason for problems.

Figure 7:
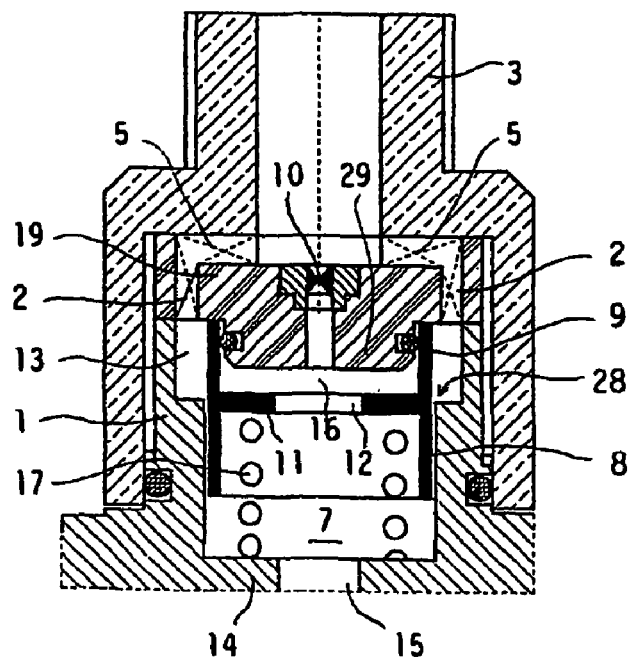
FIGS. 7 and 8 represent a fifth embodiment of the invention in a resting state and a state of operating with increased flow, respectively.
Figure 8:
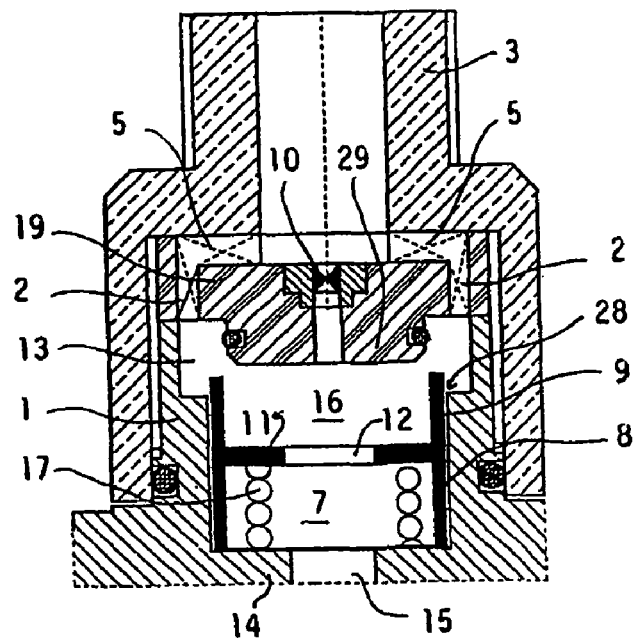

The same principle, which was explained using FIG. 6, finds another use in the form of the embodiment illustrated in FIGS. 7 and 8. In this case, the partial transition between the shell 9 of the piston 8 and a part of the supplementary element 19 that is part of the inlet fitting 3 is accomplished by pressing a projection 29 of the element 19 into the inside of the shell 9. The projection 29 is provided with a ring seal, which in the state of axial compression is arranged in a seat. This seal slightly slows down the movement of the piston 8 to prevent the accidental displacement thereof, and also compensates the tolerances of the parts with regard to their coaxiality, thus facilitating a simpler and more economical manufacturing process.

FIGS. 7 and 8 also show that a smaller gap 28 is provided between the piston 8 and the body 1 of the device. When the piston 8 is in a resting position, this gap facilitates the passage of a reduced flow in addition to the flow allowed by the flow-limiting means 10 without requiring a modification of the function of the device, which is projected taking into consideration this flow as well. The presence of this gap makes it possible to manufacture parts with greater tolerances and thereby at reduced cost.

Figure 9:
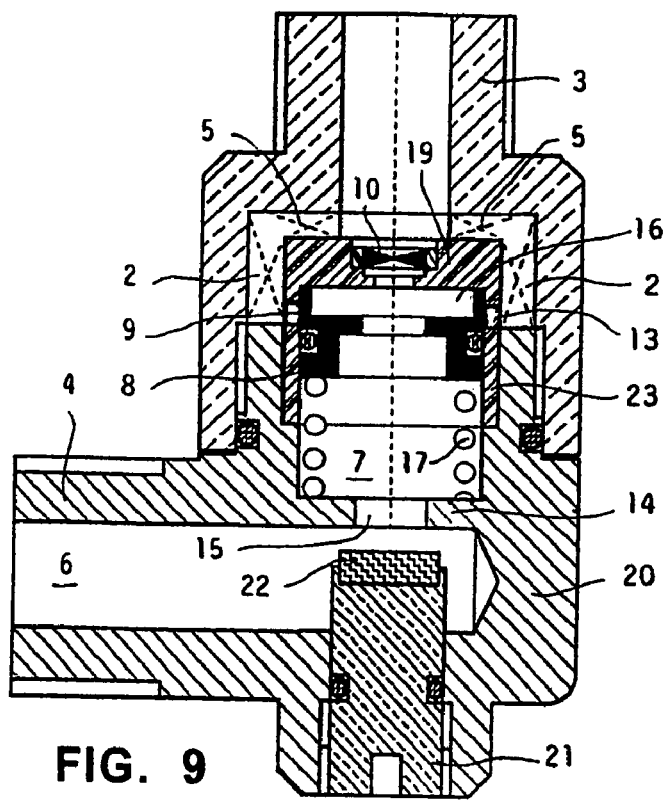
FIG. 9 represents how the device as illustrated in FIG. 6 can be fitted into a stopcock shown in a resting state.
Figure 10:
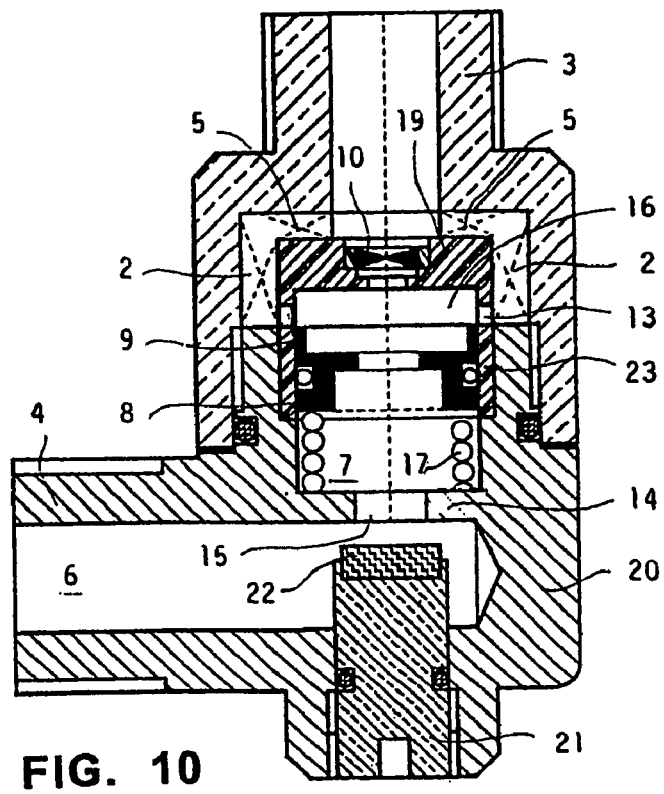
FIG. 10 represents the stopcock as illustrated in FIG. 9 in a state of operating with heavy flow.

FIGS. 9 and 10 illustrate, in a resting state and in a state with a large flow, respectively, a stopcock containing a device for dynamically controlling the flow as shown in FIG. 6.

In this case, a half of the body 20 [MD2], which is illustrated in the figures above, is essentially equivalent in terms of form and parts contained to the upper portion of the device illustrated in FIG. 6, while the bottom portion of the body 20 contains a normal closure element 21 of a stopcock, the seal 22 of which acts against the transverse wall 14 intersected by the passage 15. In this example, a side of the body 20 features the outlet fitting 4 with the outflow passage 6. This results in a compact component with dimensions that are only slightly greater than those of a normal stopcock and that facilitates a simplification of the system by having only one component, rather than two, installed in series with a thermostatic mixer.

Furthermore, in this embodiment the supplementary element 19, which is a part of the inlet fitting 3, is elongated, resulting in a cylinder 23 being formed in which the piston 8 runs. The inlet chamber 13 is formed by openings formed in this cylinder 23.

It must be established that the different modifications of parts of the device, which were described in reference to specific embodiments, can in general be used in the other embodiments as well.

As the previous paragraphs state, the invention facilitates the realization of a device for the dynamic control of a water flow that is practically immune to variations in the inlet pressure of cold water, the flow of which it regulates for the purpose of sending it to a thermostatic mixer to stabilize the mode of functioning thereof. As a result, it is no longer necessary to adjust the load of the return spring in relation to the inlet pressure present in the system, and absolutely no defect in the functioning of the device is to be observed if, for any reason, this inlet pressure changes to a major degree. Through the simple step of suitably proportioning its parts, it is possible to realize the device so that it satisfies various demands of the installation. Furthermore, the simplicity and limited dimensions of the device allow it to be fitted into a stopcock should it be deemed necessary.

It must be established that the invention is not limited to the embodiments described and illustrated as examples. The most diverse modifications have been described with additional being within the realm of the knowledge of a person skilled in the art. These and additional modifications as well as any substitution with technical equivalents can be added to the described and illustrated embodiments without representing a departure from the protective scope of the invention and this patent.

What is claimed is:

1. A device for the dynamic control of a flow comprising, in a body, an inlet fitting, an inlet chamber, an outlet chamber, a piston, which is arranged between the inlet chamber and the outlet chamber and can be moved between a first position, which is displaced to the inlet chamber, wherein the piston constricts the flow between the inlet chamber and the outlet chamber when in the first position, and a second position, which is displaced to the outlet chamber, wherein the piston does not constrict the flow between the inlet chamber and the outlet chamber when in the second position, and a return spring, which acts upon the piston to move it to the first position, wherein the inlet chamber is at least partly ring-shaped and encloses the piston, the piston comprises a cylindrical shell section arranged in the area of the inlet chamber and a transverse segment, which defines a intermediate chamber and is crossed by an axially limited passage; a flow-limiting means is arranged between the inlet fitting and the intermediate chamber, wherein the axially limited passage and the return spring are proportional to one another so that the effect of the spring is essentially equal to the force that acts to shift the piston out of the first position and into the second position, when the maximum flow allowed by the flow-limiting means is discharged, and the intermediate chamber in the body of the device is bordered by an inlet fitting in which an inlet chamber is defined and which features a transverse wall in which axial circumferential passages are formed, which open in the ring-shaped inlet chamber, which encloses the piston, while the flow-limiting means is installed in the center of the transverse wall.

2. The device for the dynamic control of a flow as claimed in claim 1 the inlet chamber and the axial circumferential passages are formed by passages that are contained in a supplementary element that is disposed between the body of the device and the inlet fitting, of which it is a part.

3. The device for the dynamic control of a flow as claimed in claim 2 wherein the supplementary element is elongated so that it forms a projection that extends into the piston and features a ring-shaped seal, which is arranged in its seat when subjected to axial compression.

4. The device for the dynamic control of a flow as claimed in claim 2 wherein the supplementary element is elongated so that it forms a cylinder running in the piston and defines the inlet chamber in the form of openings arranged in the cylinder.

5. The device for the dynamic control of a flow as claimed in claim 2 wherein the supplementary element is manufactured from a pierced synthetic material.

6. The device for the dynamic control of a flow as claimed in claim 1 wherein in its first closed position, the piston abuts the level surface of the supplementary element.

7. The device for the dynamic control of a flow as claimed in claim 1 wherein in its first closed position, the piston is partly engaged in a seat that is formed by a level surface of the inlet fitting.

8. The device for the dynamic control of a flow as claimed in claim 1 wherein in its first closed position, the piston is partly attached to a projection that is formed by a level surface of the inlet fitting.

* * * * *